Patented June 1, 1954

2,680,078

UNITED STATES PATENT OFFICE 2,680,078

ALKALINE-OXIDIZED CASSAVA STARCH ADHESIVE

Reino Alexander Jarvi, Seattle, Wash., assignor to Monsanto Chemical Company, St. Louis, Mo., a corporation of Delaware No Drawing. Application August 29, 1951,
Serial No. 244,278

6 Claims. (Cl. 106—213)

This invention relates to improvements in alkaline-oxidized cassava starch adhesives and to the process for making same. More particularly it relates to improvements in alkaline-oxidized tapioca flour adhesives and to the process for making same.

Cassava starches and tapioca flours have a moisture content which is substantially in equilibrium with that of the atmosphere and it is to be understood unless otherwise modified that the expressions "cassava starch" and "tapioca flour" in this specification and in the appended claims are intended to include cassava starch and tapioca flour containing a moisture content in equilibrium with that of the atmosphere. The moisture content of tapioca flours and cassava starches is usually about 10 to 12%. For purposes of this invention cassava starch is considered to be generic to tapioca flour.

It is an object of this invention to provide a quick setting, ready-to-use, low-water content wood adhesive characterized by a long liquid life and reduced staining properties. Further it is an object of this invention to provide a strong glue characterized by ease of spreading. It is also an object of this invention to provide a low cost alkaline-oxidized cassava starch adhesive and an improved process for making same. Further objects will be apparent to those skilled in the art.

It has been discovered that these and other objects may be accomplished by reacting at a temperature of at least 50° F. over a restricted period of time a mixture comprising cassava starch, water, an oxidizing agent for cassava starch, and sodium hydroxide, the weight ratio of cassava starch as anhydrous cassava starch to water and sodium hydroxide being approximately 30:60–71:1.0–1.34.

The preferred adhesives of this invention are obtained by reacting a mixture comprising the aforedescribed ingredients in said specified proportions at 50 to 65° F. for a period of approximately 8 hours. Of this group of new adhesives the particularly preferred are those obtained by reacting in the presence of an oxidizing agent for cassava starch, a mixture comprising the ratio of approximately 65 parts water and approximately 1.2 to 1.26 parts sodium hydroxide per 30 parts anhydrous cassava starch. In many instances the presence of about 0.05 to 0.5% by weight based upon cassava starch of an alkali metal salt of an alkylated aryl sulfonic acid has been found advantageous.

The following is illustrative of this invention:

Example 1

In a suitable reaction vessel containing a slurry of approximately 320 parts by weight of high grade Brazilian tapioca flour, which contains approximately 10 percent water, in approximately 500 parts by weight of water is added with agitation approximately 10 parts by weight of an aqueous solution containing 3% by weight hydrogen peroxide and then approximately 0.65 part by weight of sodium bicarbonate. To the mix so formed is added with agitation approximately 124 parts by weight of an aqueous solution containing 12 parts by weight of sodium hydroxide and the mixture stirred for approximately 8 hours at 60–65° F. The resultant glue possesses a MacMichael viscosity of 70 on the No. 22 wire at 70° F., a liquid life of more than 14 months, and a pH of 11.5. Upon evaluating in the usual manner it is found that this glue requires 45 minutes under pressure to bond a kiln dried fir stock. The weight ratio of reactants employed is approximately 1.26 parts sodium hydroxide and approximately 65 parts water per 30 parts anhydrous tapioca flour.

For comparative purposes the following illustrates an alkaline-oxidized cassava starch adhesive described in the art as the "perfect" wood adhesive and its method of manufacture:

Example 2

In a suitable reaction vessel containing a slurry of approximately 320 parts by weight of high grade Brazilian tapioca flour, which contains approximately 10 percent water, in approximately 500 parts by weight of water is added with agitation approximately 10 parts by weight of an aqueous solution containing 3% by weight hydrogen peroxide and then approximately 0.65 part by weight of sodium bicarbonate. To the mix so formed is added with agitation approximately 160 parts by weight of an aqueous solution containing 24 parts by weight of sodium hydroxide and the mixture stirred for 12 hours at 70° F. The glue so obtained possesses a MacMichael viscosity of 45 on the No. 22 wire at 70° F., a liquid life of 8 months, and a pH of 13.5. Upon evaluation in the usual manner it is found that this glue requires at least 90 minutes under the same pressure as that of Example 1 to bond the same kiln dried fir stock.

The adhesive of Example 1 exhibits less staining properties than the adhesive of Example 2, and also possesses superior spreading properties.

A comparison of the data of the respective examples above demonstrates the improvement obtained by preparing an alkaline-oxidized cassava starch adhesive in accordance with the method of the present invention.

The amount of oxidizing agent will vary, obviously, depending upon the particular cassava starch. Hydrogen peroxide is the preferred agent and for oxidizing purposes at least 0.05% by weight based upon the cassava starch or tapioca is used. It is preferred to employ approximately 0.1% by weight hydrogen peroxide, however, amounts up to 0.5% by weight may be employed where desired. In the process of this invention other oxidizing agents capable of oxidizing cassava starch or tapioca may be used than hydrogen peroxide, for example, equivalent amounts of barium peroxide, benzoyl peroxide, sodium hypochlorite, chlorine, the perchlorates, the perborates and the like.

Reaction times in the range of about 6 to 9 hours may be employed in the process of this invention, however, a reaction time of approximately 8 hours produces optimum results.

The preferred operating or reaction temperature range of this invention is approximately 50–65° F., however, higher temperatures may be employed, as for example up to 100° F. Optimum results are obtained at approximately 60–65° F.

Although sodium bicarbonate is not necessary in the manufacture of the adhesives of this invention its presence has been found advantageous in that it not only functions as a filler but appears to be a stabilizing agent for the action of the oxidizing agent. In place of sodium bicarbonate other analogous materials well known to those skilled in the art, such as whiting, may be employed where desired.

The various water proofing agents, such as carbon disulfide and other well known adhesive adjuvants such as sodium silicate may be used in the process for making the adhesives of this invention.

The term "water" as employed in the appended claims is intended to include water as such and water forming the solvent for the various additives but is exclusive of the water content of the cassava starch or tapioca flour.

While the invention has been described in detail with respect to certain embodiments it is to be understood that variations and modifications thereof obvious to those skilled in the art may be made without departing from the spirit and scope of the invention.

What is claimed is:

1. The method of making an alkaline-oxidized cassava starch adhesive which comprises reacting at a temperature of at least 50° F. and up to about 100° F. over a period of approximately 6 to 9 hours a mixture comprising cassava starch, water, sodium hydroxide and an oxidizing agent for said starch, the proportions by weight of anhydrous cassava starch, water and sodium hydroxide being approximately 30:60–71:1.0–1.34.

2. The method of making an alkaline-oxidized tapioca flour adhesive which comprises reacting at a temperature of 50 to 65° F. over a period of approximately 8 hours a mixture comprising tapioca flour, water, sodium hydroxide and an oxidizing agent for said starch, the proportions by weight of anhydrous tapioca flour, water and sodium hydroxide being approximately 30:60–71:1.0–1.34.

3. The method of making an alkaline-oxidized tapioca flour adhesive which comprises reacting at a temperature of 50 to 65° F. over a period of approximately 8 hours a mixture comprising tapioca flour, water, sodium hydroxide and hydrogen peroxide, the proportions by weight of anhydrous tapioca flour, water and sodium hydroxide being approximately 30:65:1.2–1.26, the amount of hydrogen peroxide being at least 0.05% by weight based upon the tapioca flour.

4. The method of making an alkaline-oxidized tapioca flour adhesive which comprises reacting at a temperature of 50 to 65° F. over a period of approximately 8 hours a mixture comprising tapioca flour, water, sodium hydroxide and hydrogen peroxide, the proportions by weight of anhydrous tapioca flour, water and sodium hydroxide being approximately 30:65:1.2–1.26, the amount of hydrogen peroxide being approximately 0.1 to 0.5% by weight based upon the tapioca flour.

5. The method of making an alkaline-oxidized tapioca flour adhesive which comprises reacting at a temperature of 60 to 65° F. over a period of approximately 8 hours a mixture comprising tapioca flour, water, sodium hydroxide and hydrogen peroxide, the proportions by weight of anhydrous tapioca flour, water and sodium hydroxide being approximately 30:65:1.2–1.26, the amount of hydrogen peroxide being approximately 0.1 to 0.5% by weight based upon the tapioca flour.

6. The method of making an alkaline-oxidized tapioca flour adhesive which comprises reacting at a temperature of 60 to 65° F. over a period of approximately 8 hours a mixture comprising tapioca flour, water, sodium hydroxide and hydrogen peroxide, the proportions by weight of anhydrous tapioca flour, water and sodium hydroxide being approximately 30:65:1.2–1.26, the amount of hydrogen peroxide being approximately 0.1% by weight based upon the tapioca flour.

References Cited in the file of this patent

UNITED STATES PATENTS

| Number | Name | Date |
| --- | --- | --- |
| 2,204,615 | Nivling | June 18, 1940 |
| 2,307,684 | Kauffmann et al. | Jan. 5, 1943 |
| 2,606,188 | Yelland | Aug. 5, 1952 |